United States Patent [19]

Guibert

[11] 4,399,159

[45] Aug. 16, 1983

[54] VERTABLE TRAY AND LID ASSEMBLY FOR HEATING FOODS

[75] Inventor: Raul Guibert, Los Angeles, Calif.

[73] Assignee: Sunset Ltd., Los Angeles, Calif.

[21] Appl. No.: 282,607

[22] Filed: Jul. 13, 1981

Related U.S. Application Data

[60] Continuation-in-part of Ser. No. 971,381, Dec. 20, 1978, Pat. No. 4,326,497, which is a division of Ser. No. 809,775, Jun. 24, 1977, Pat. No. 4,132,216, which is a continuation-in-part of Ser. No. 776,772, Mar. 11, 1977, Pat. No. 4,112,916.

[51] Int. Cl.³ .................. B65D 51/16; B65D 5/64
[52] U.S. Cl. ........................... 426/113; 426/106; 426/118; 426/393; 426/395; 426/403; 220/366; 220/208; 229/43; 206/511
[58] Field of Search .......... 426/118, 114, 395, 403, 426/407, 113, 106, 393; 220/366, 208, 201, 202; 229/43

[56] References Cited

U.S. PATENT DOCUMENTS

| | | | |
|---|---|---|---|
| 1,694,851 | 12/1928 | Glass | 215/260 |
| 3,047,177 | 7/1962 | Poitras et al. | 215/260 |
| 3,065,875 | 11/1962 | Negoro | 229/43 |
| 3,223,305 | 12/1965 | Edwards | 229/1.5 B |
| 3,240,610 | 3/1966 | Cease | 426/113 |
| 3,362,565 | 1/1968 | McCormick | 220/366 |
| 3,381,872 | 5/1968 | Holder | 220/366 |
| 3,455,500 | 7/1969 | Wilcox | 229/43 |
| 3,598,271 | 8/1971 | Holley | 229/43 |
| 3,677,435 | 7/1972 | Davis | 220/366 |
| 3,794,090 | 2/1974 | Commisso | 220/366 |
| 3,797,694 | 3/1974 | See | 426/118 |
| 3,809,280 | 5/1974 | Park | 220/366 |

FOREIGN PATENT DOCUMENTS 1257896  12/1971  United Kingdom ............... 426/113

Primary Examiner—Steven L. Weinstein
Attorney, Agent, or Firm—Michael Ebert

[57] ABSTRACT

A tray and lid assembly formed of synthetic plastic material for containing a pre-cooked meal which is to be stored in the frozen state and thereafter reheated before being served. The tray which has a polygonal shape is provided with an outwardly-extending continuous flange running along the upper edge of the sides to surround the open mouth. The lid, which has the same geometry as the tray and is of the same material, has a downwardly-extending peripheral skirt which engages the periphery of the tray flange and a continuous underside strip which is received within the mouth of the tray. Because of the presence of the meal in the tray, when the assembly is subjected to freezing temperatures, the lid contracts to a somewhat greater extent than the tray, as a consequence of which the skirt is caused to press against the flange to effect an outer seal, whereas the strip is inwardly displaced from the mouth to provide a leakage path. When, however, the assembly is thereafter subjected to heating, the lid proceeds to expand to a somewhat greater extent than the tray; but before the strip is caused to press against the mouth of the tray to effect an inner seal, the expanding heated air is permitted to escape through the leakage path and through vents in the outer seal at the corners of the skirt.

7 Claims, 7 Drawing Figures

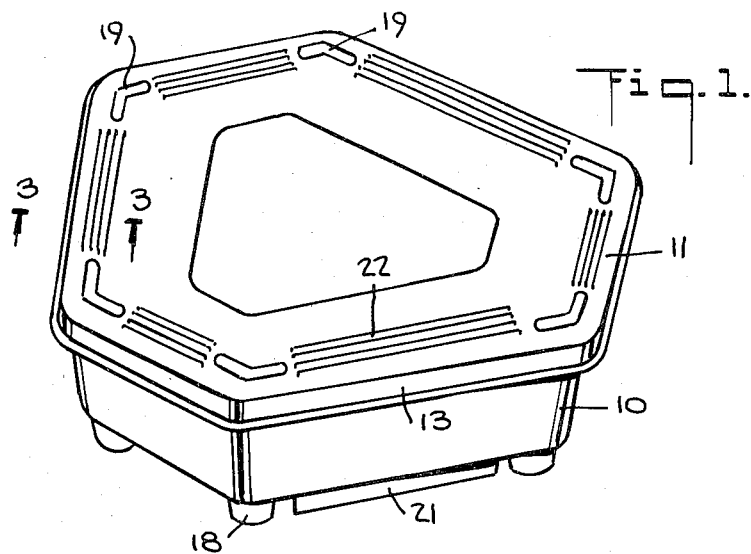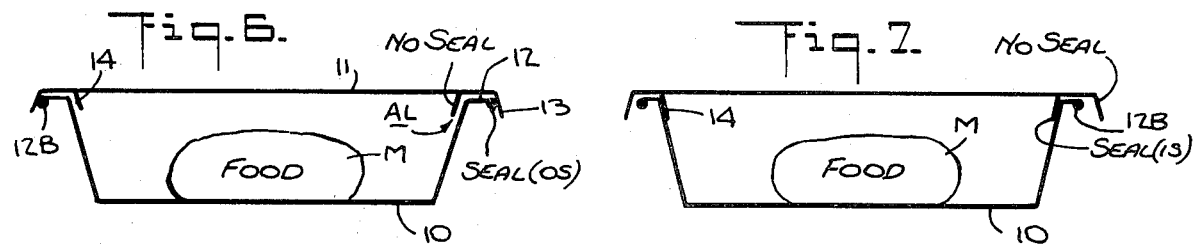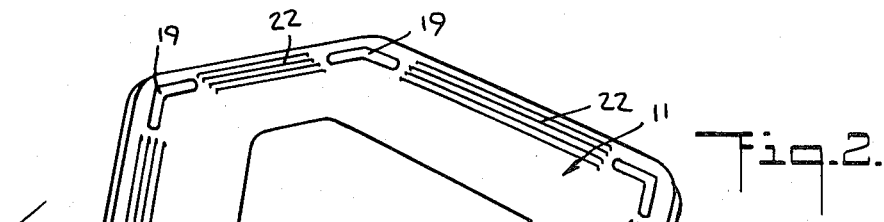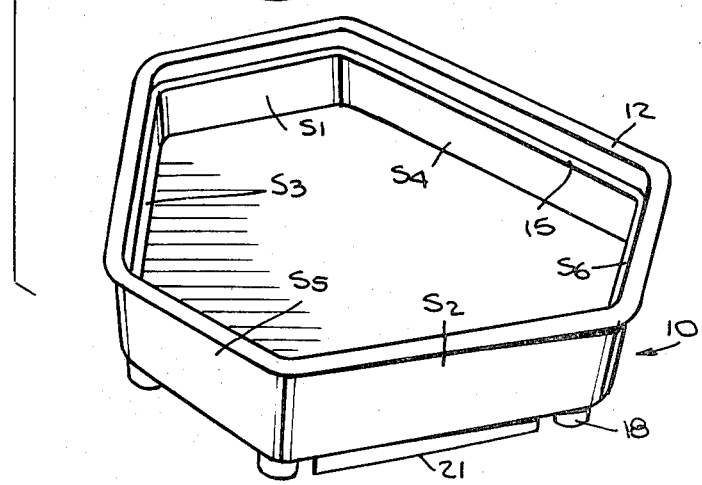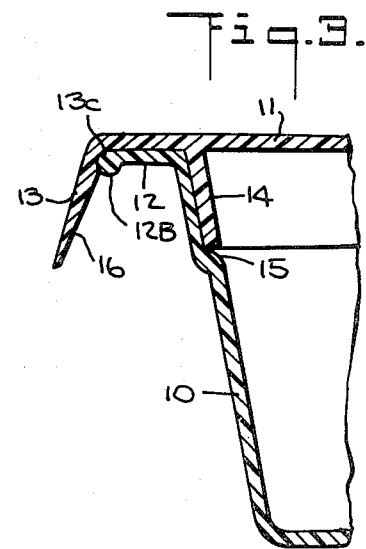

VERTABLE TRAY AND LID ASSEMBLY FOR HEATING FOODS

RELATED APPLICATION

This application is a continuation-in-part of my copending application Ser. No. 971,381, filed Dec. 20, 1978, now U.S. Pat. No. 4,326,497, which is a division of my copending application Ser. No. 809,775, filed June 24, 1977, now U.S. Pat. No. 4,132,216, which in turn is a continuation-in-part of my copending application Ser. No. 776,772, filed Mar. 11, 1977, now U.S. Pat. No. 4,112,916.

BACKGROUND OF INVENTION

This invention relates generally to sealed trays for storing food products, and more particularly to a tray and lid assembly for a pre-cooked meal which makes it possible to store the meal in the frozen state and to thereafter reheat the meal to a service temperature level without degrading its basic texture, flavor and nutritional qualities.

To meet the growing need for quickly-prepared, low-cost meals, convenience food operations have been developed in which the food to be served is first cooked and then stored in the cold or frozen state. When an order is placed for a particular item on the menu, the selected item is withdrawn from the freezer, the frozen pre-cooked meal is then thawed and reheated.

In reheating a pre-cooked frozen meal in homes, restaurants and other facilities, it is difficult, when going from the frozen state to an adequately heated service condition, to avoid a situation in which the core of the product is still cold even though the outer layer is quite hot. And when one seeks to ensure that the body of the food is hot throughout, there is a tendency to overheat the meal and thereby re-cook it, with a resultant loss of nutritional value and flavor.

In my related U.S. Pat. No. 4,112,916, "Hot Air Oven For Food-Loaded Cartridges," and in the above-identified patent applications, there is disclosed a convenience food service technique in which pre-cooked meals which have been refrigerated and stored may be thereafter reheated and made directly available to customers, the technique being such that the essential flavor, texture and nutritional qualities of the meal as originally cooked, are substantially retained in the recooked meal.

In the apparatus disclosed in my prior patent and patent applications, the pre-cooked meal is placed in a tray covered by a lid. The concern of the present invention is with a tray and lid assembly for a pre-cooked meal which takes into account the varying temperature conditions to which the meal is subjected and which hermetically seals in the meal only when the need for a seal is dictated by the technique.

Thus when the pre-cooked meal is first placed in the tray and covered by the lid, and the covered tray is then placed in a refrigeration chamber to freeze the meal, it is essential at this point that the tray be effectively sealed to prevent the infiltration therein of humid air and airborne bacteria. When, however, the covered tray containing the frozen meal is thereafter placed in an oven of the type disclosed in my prior patent and patent applications to reheat the meal to a service temperature level, it is essential in the initial course of heating when the air within the covered tray is being heated and expanded, that the covered tray be vented to relieve the expanding air. Otherwise, the resultant air pressure may cause the sealed tray to explode. But once the expanding hot air has been expelled from the covered tray, it is desirable to again seal the tray so that moisture and volatile oils in the food being heated are not discharged but are retained.

Clearly, therefore, a tray and lid assembly which remains unsealed regardless of whether the food is being frozen or heated will not satisfy the requirements of the technique, nor will an assembly which is always sealed; for in neither case will the assembly, when necessary, allow air to escape from the covered tray.

SUMMARY OF INVENTION

In view of the foregoing, the main object of this invention is to provide a tray and lid assembly for containing a pre-cooked meal which is to be frozen and stored and thereafter reheated in a food handling process, the assembly acting to seal the tray and thereby isolate it from the atmosphere or vent the tray to the atmosphere in accordance with the requirements of the process.

More particularly, an object of this invention is to provide an assembly of the above type which is provided with inner and outer seals that are caused to open and close in a manner acting to prevent an excessive build-up of air pressure within the assembly and serving to prevent the loss of volatile constituents from the meal.

Also an object of this invention is to provide a tray and lid assembly in which each tray, when empty, may be nested within a like tray so that a large number of empty trays can be formed into a compact stack which may be stored in a small area.

Briefly stated, these objects are accomplished in a tray and lid assembly formed of synthetic plastic material for containing a pre-cooked meal which is to be stored in the frozen state and thereafter reheated before being served. The tray has a polygonal shape and provided with an outwardly-extending continuous flange running along the upper edge of the sides to surround the open mouth. The lid, which has the same geometry as the tray and is of the same material, has a downwardly-extending peripheral skirt which engages the periphery of the tray flange and a continuous underside strip which is received within the mouth of the tray.

Because of the presence of the meal in the tray, when the assembly is subjected to freezing temperatures, the lid contracts to a somewhat greater extent than the tray, as a consequence of which the skirt is caused to press against the flange to effect an outer seal, whereas the strip is then inwardly displaced from the mouth to provide a leakage path. When, however, the assembly is thereafter subjected to heating, the lid proceeds to expand to a somewhat greater extent than the tray; but before the strip is caused to press against the mouth of the tray to effect an inner seal, the expanding heated air is permitted to escape through the leakage path and through vents in the outer seal at the corners of the skirt.

OUTLINE OF DRAWINGS

For a better understanding of the invention as well as other objects and further features thereof, reference is made to the following detailed description to be read in conjunction with the accompanying drawings, wherein:

FIG. 1 shows, in perspective, a tray and lid assembly in accordance with the invention;

FIG. 2 is the same as FIG. 1, with the lid being raised to expose the interior of the tray;

FIG. 3 is a section taken in the plane indicated by line 3—3 in FIG. 1;

FIG. 6 schematically illustrates the relationship of the lid to the tray when the assembly is subjected to food-freezing temperatures; and FIG. 7 schematically illustrates the relationship when the assembly is subjected to food-heating temperatures.

DESCRIPTION OF INVENTION

Structure of Assembly

Referring to FIGS. 1 and 2, there is shown a tray and lid assembly according to the invention, consisting of a tray 10 and a lid 11 therefor. The tray and lid are both molded of a synthetic plastic material such as polyethylene or polypropylene which is non-reactive with food and is capable of withstanding the range of temperatures to which the pre-cooked meal is subjected.

As pointed out previously, the pre-cooked meal to be contained in the tray and sealed therein by the lid is first placed in a refrigerator and subjected to a temperature close to or below the freezing point and it is thereafter transferred to a hot-air oven of the type disclosed in my above-identified patent where it is heated to a temperature in the order of 140° to 170° F. to render it suitable for serving. The apparatus for carrying out this food handling technique is described in the copending applications referred to hereinabove.

Tray 10 has a hexagonal configuration whose sides are constituted by a short rear wall $S_1$, a longer front wall $S_2$, a pair of long side walls $S_3$ and $S_4$ adjoining rear wall $S_1$, and a pair of short side walls $S_5$ and $S_6$ adjoining front wall $S_2$. Running along the upper edge of these walls and the corners formed thereby is a continuous, outwardly-extending flange 12 which surrounds the open mouth of the tray and is provided at its underside with a peripheral bead 12B.

Figure 4:
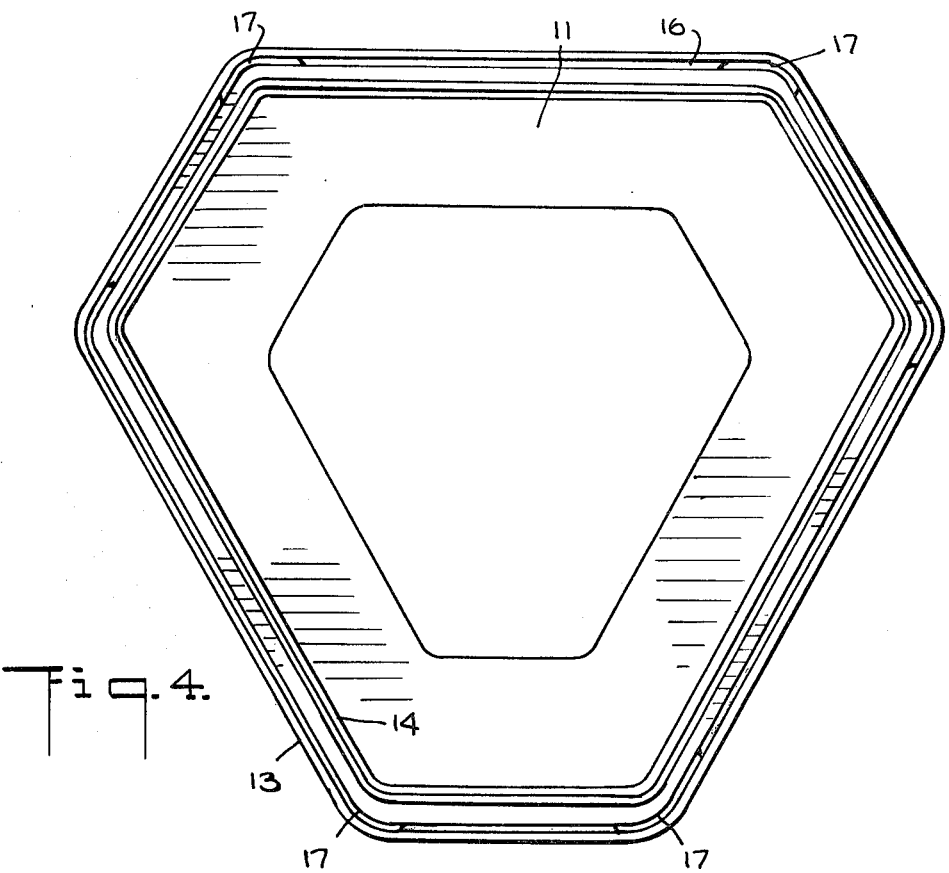
FIG. 4 is a bottom view of the lid.
Figure 5:
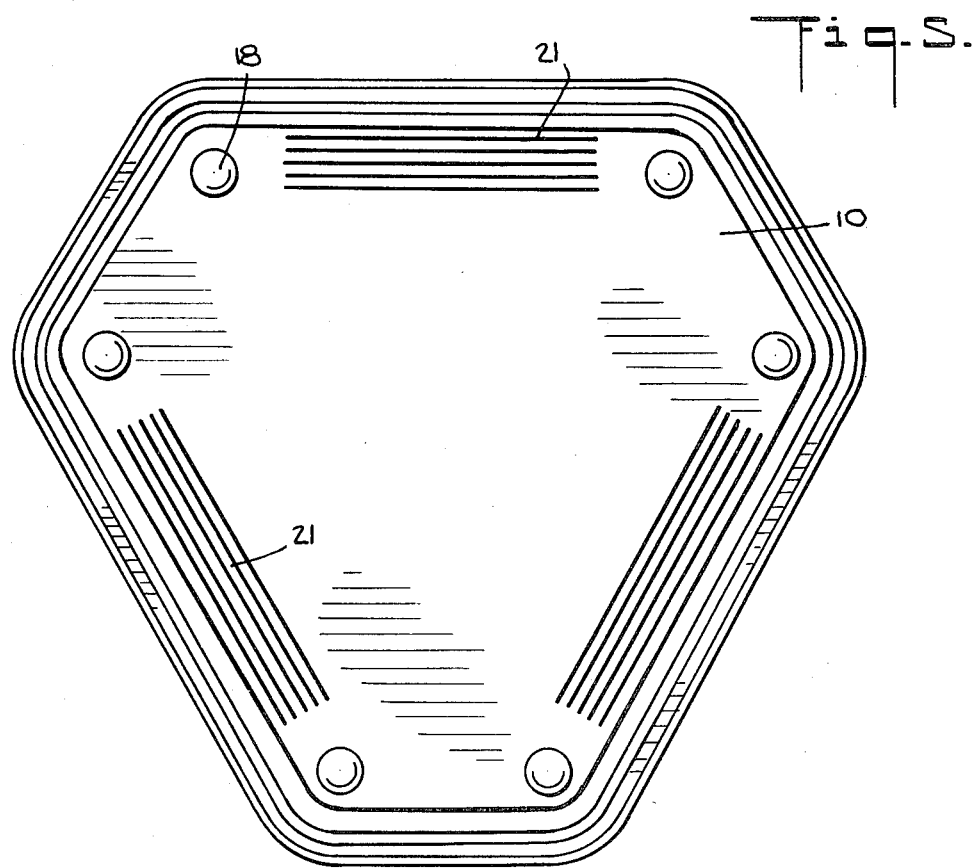
FIG. 5 is a bottom view of the tray.

Lid 11 has the same geometric configuration as the tray and is provided with a downwardly-extending continuous skirt 13 which fits over tray flange 12, the lid serving to seal the pre-cooked meal contained therein against the loss of moisture and other volatile constituents, yet being adapted to vent the assembly when necessary. As best seen in FIGS. 3 and 4, in order to provide inner and outer seals which take into account the temperature range to which the assembly is subjected, lid 11 is provided at its underside with a continuous strip 14 which has a hexagonal form and is positioned inwardly from skirt 13 to define a space therebetween sufficient to accommodate the outwardly-extending tray flange 12.

Strip 14, as best seen in FIG. 3, is somewhat resilient and is received within the open mouth of tray 10. Strip 14 is pressable against the side walls of the tray to form an inner seal therewith, the side walls of the tray having a shoulder 15 to accommodate the strip.

Bead 12B of the tray flange 12 snaps into a continuous cavity 13C formed on the underside junction between skirt 13 and lid 11, an outer seal being effected when skirt 13 is pressed against flange bead 12B. Cavity 13C is defined by a wedge-shaped rib 16 on the inner wall of the skirt, this rib being interrupted at the corners to provide small air vents 17. These interruptions also facilitate the removal of the lid from the tray, for the lid is not locked to the tray at the corners and can be easily pried open at these points. (In FIG. 3, it will be seen that wedge-shaped rib on the inner wall of skirt 13 is integral with this skirt and therefore is not an element separate therefrom. However, for purposes of explanation, rib 16 is treated as a separate element.)

In order to provide air spaces between the tray and lid assemblies when they are stacked one above the other, the underside of the base of the tray is provided with spacer posts 18 to create the air spaces, such that in the hot air oven, hot air is circulated through the spaces between the assemblies to head the foot contents. These spacer posts 18 sit within V-shaped projections 19 on the lid 11 which ensure proper placement of the trays in their stacked positions.

Extending between the posts 18 on the base of the tray are sets of parallel ribs 21, and extending between the projections 19 on the lid are similar sets of ribs 22. Because the tray and lid assembly is hot after the heating operation is completed, the ribs make it possible for a user to handle the assembly without discomfort by grasping the assembly between the thumb and index finger of his hand, thereby avoiding direct contact with the flat of the hot tray bottom and the flat of the lid.

The walls of the trays are slightly canted so that they converge toward the base making its possible to nest the empty trays one within the other to produce a compact stack of telescoped trays which facilitates storage of the trays within a limited area. The lids, of course, may be neatly stacked one upon the other.

While the tray and lid assembly is illustrated as having a hexagonal shape, the invention is not limited to this shape. The tray and lid assembly may, for example, have a rectangular or triangular configuration.

Operation of Assembly

Referring now to FIG. 6 which shows a pre-cooked meal M in the tray and lid assembly, we shall consider the operation of the assembly when the packaged meal is placed in a refrigeration chamber to freeze the meal so that it can be stored until there is a demand therefor. (It is to be noted that in FIGS. 6 and 7, pre-cooked meal M rests on tray 10 but is out of physical contact with lid 11.)

The construction of the assembly is such that at normal room temperature, say, 70° F., the strip 14 of the lid fits neatly into the mouth of the tray, and the skirt 13 snaps over flange 12, so that the lid is thereby mechanically locked in place. An inner seal IS is formable between the lid strip 14 and the mouth of tray 10, and an outer seal OS is formable between skirt 13 of the lid and flange bead 12B of the tray.

If now the tray and lid assembly is placed in a freezer, because the synthetic plastic material from which the assembly is made has a positive thermal coefficient, the tray and lid proceed to contract. However, the tray and lid, even though of the same material, do not contract at the same rate, for the food in the tray acts as a heat sink therefor, as a consequence of which the lid contracts to a somewhat greater extent. This differential contraction serves to displace the strip inwardly from the mouth, thereby breaking the inner seal to create an air leakage path AL. However, the skirt of the lid, because of the differential contraction, is caused to press harder against the flange bead to tighten the outer seal OS.

Thus in the process of freezing, the outer seal OS is strengthened and acts to prevent the infiltration of humid or contaminated air into the assembly, thereby protectively sealing in the food. The freezing temperatures are usually in the range of 10 to 34 degrees F. to effect cooling or freezing in accordance with the requirements of the food handling technique.

When the packaged refrigerated meal is later transferred to an oven and subjected to a temperature of, say, 150 to 250 degrees F. to raise the temperature to a service level, the cold food in the tray results in differential expansion of the tray and lid, for the initially cold food keeps the tray at a somewhat lower temperature when the assembly is subjected to the flow of heated air in the oven.

As a consequence, in the initial phase of heating, the heated and expanding air in the assembly is free to escape through the air leakage path AL and through the tiny vents 17 at the corners of the lid. But because the lid proceeds to expand at a somewhat greater rate than the tray, the strip of the lid then presses against the mouth of the tray to close inner seal IS, thereby preventing the loss of moisture and volatile components from the meal which is now sealed in the tray. While the expansion of the lid relative to the tray causes the outward displacement of the skirt to break outer seal OS, it is the inner seal IS which then protects the food.

In summary, therefore, at ambient temperature the inner and outer seals of the tray and lid assembly are both operative, but relatively weak, for no pressure is applied thereto. When the food-loaded tray is placed in a cooling chamber, the inner seal is opened by relative contraction of the lid and tray, but the outer seal is strengthened to prevent infiltration; and when the food-loaded assembly is transferred to a heating oven, initially expanding air is permitted to escape therefrom by reason of relative expansion of the lid and tray, and the inner seal is then caused to close and the outer seal to open to prevent the loss of volatile components.

While there has been shown and described a preferred embodiment of a tray and lid assembly in accordance with the invention, it will be appreciated that many changes and modifications may be made therein without, however, departing from the essential spirit thereof.

I claim:

1. A tray and lid assembly loaded with a pre-cooked meal which rests on the tray but is out of physical contact with the lid, the loaded assembly being first placed in storage in a cooling chamber and thereafter being transferred to a heating oven to reheat the food to a serving temperature whereby in the cooling mode the meal is subjected to a temperature well below ambient temperature, and in the heating mode to a temperature well above ambient temperature, said assembly comprising:

A. an open-mouthed tray having a polygonal shape provided with side walls whose junctions form corners, said tray being fabricated of synthetic plastic material non-reactive with the meal, said tray being also provided with a continuous outwardly-extending flange which surrounds the open mouth and has a peripheral bead;

B. a lid having the same shape as the tray and fabricated of the same material, whereby the tray and lid have the same positive thermal coefficient, said lid having a continuous downwardly-extending skirt, the inner wall of the skirt having a rib thereon to define at its junction with the lid a cavity to receive the bead of the flange, the rib being interrupted at the corners to create air vents; and a continuous underside strip which at ambient temperature is received within the mouth of the tray; said lid in the cooling mode contracting to a somewhat greater extent than the loaded tray in which the meal acts as a heat sink to retard cooling of the tray to cause said strip to shift inwardly with respect to said mouth to create an air leakage path and to cause said bead to press into said cavity to create an outer seal preventing infiltration of ambient air into the assembly, said lid in the heating mode expanding to a somewhat greater extent than the loaded tray in which the meal acting as a heat sink retards heating of the tray to initially cause heated and expanding air within the tray to escape through said air leakage path and said vents, after which said strip is pressed against the sides of the tray to form an inner seal preventing the escape of volatile constituents from the meal.

2. An assembly as set forth in claim 1, wherein said shape is hexagonal.

3. An assembly as set forth in claim 1, wherein said material is polyethylene.

4. An assembly as set forth in claim 1, wherein said side walls are canted, making it possible to nest each tray within a like tray.

5. An assembly as set forth in claim 1, wherein said tray is provided at its bottom with spacer posts.

6. An assembly as set forth in claim 5, wherein said lid is provided with V-shaped projections within which said posts are seated to ensure proper placement of the assemblies when they are stacked one above the other.

7. An assembly as set forth in claim 6, further including ribs extending between the posts of the tray and the projections of the ribs to facilitate handling of the assembly at the serving temperature.

* * * * *